April 13, 1937.   K. H. HUBBARD   2,076,641
HEAT EXCHANGE SYSTEM
Filed May 12, 1934   2 Sheets-Sheet 1
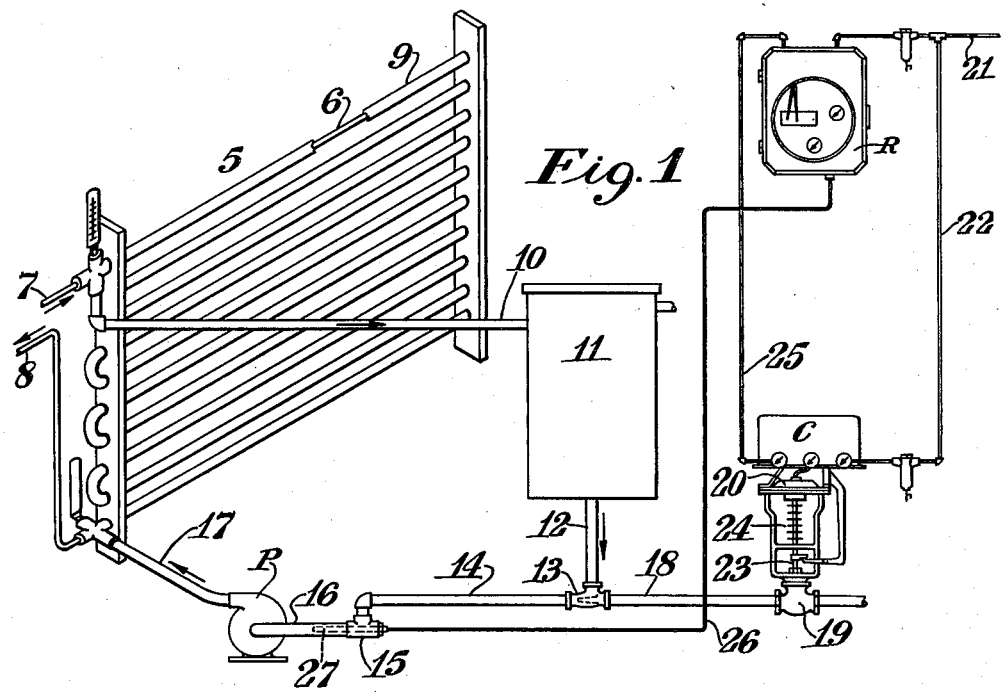
*Fig. 1*
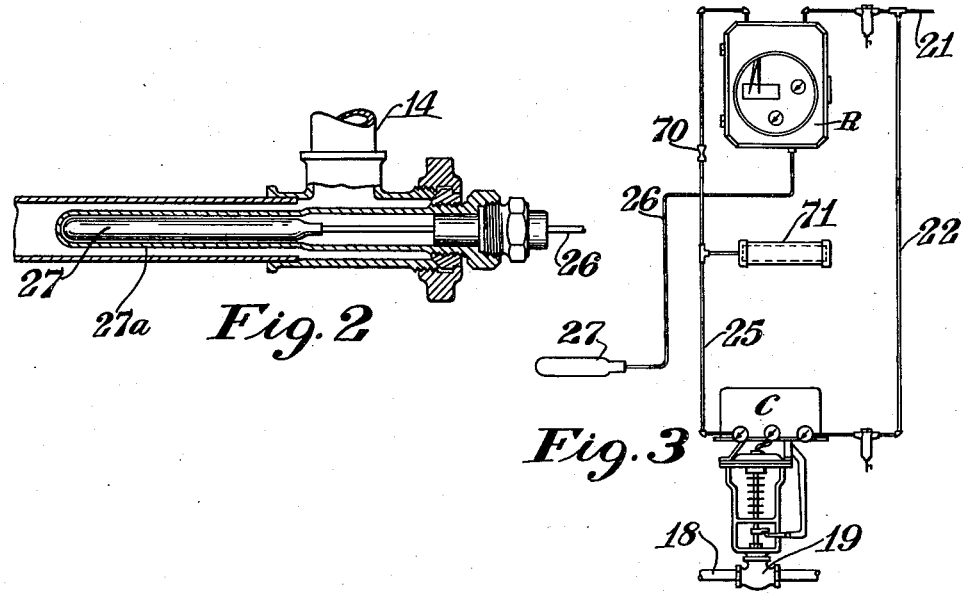
*Fig. 2*
*Fig. 3*
INVENTOR
*Karl H. Hubbard*
BY *D. Clyde Jones*
ATTORNEY

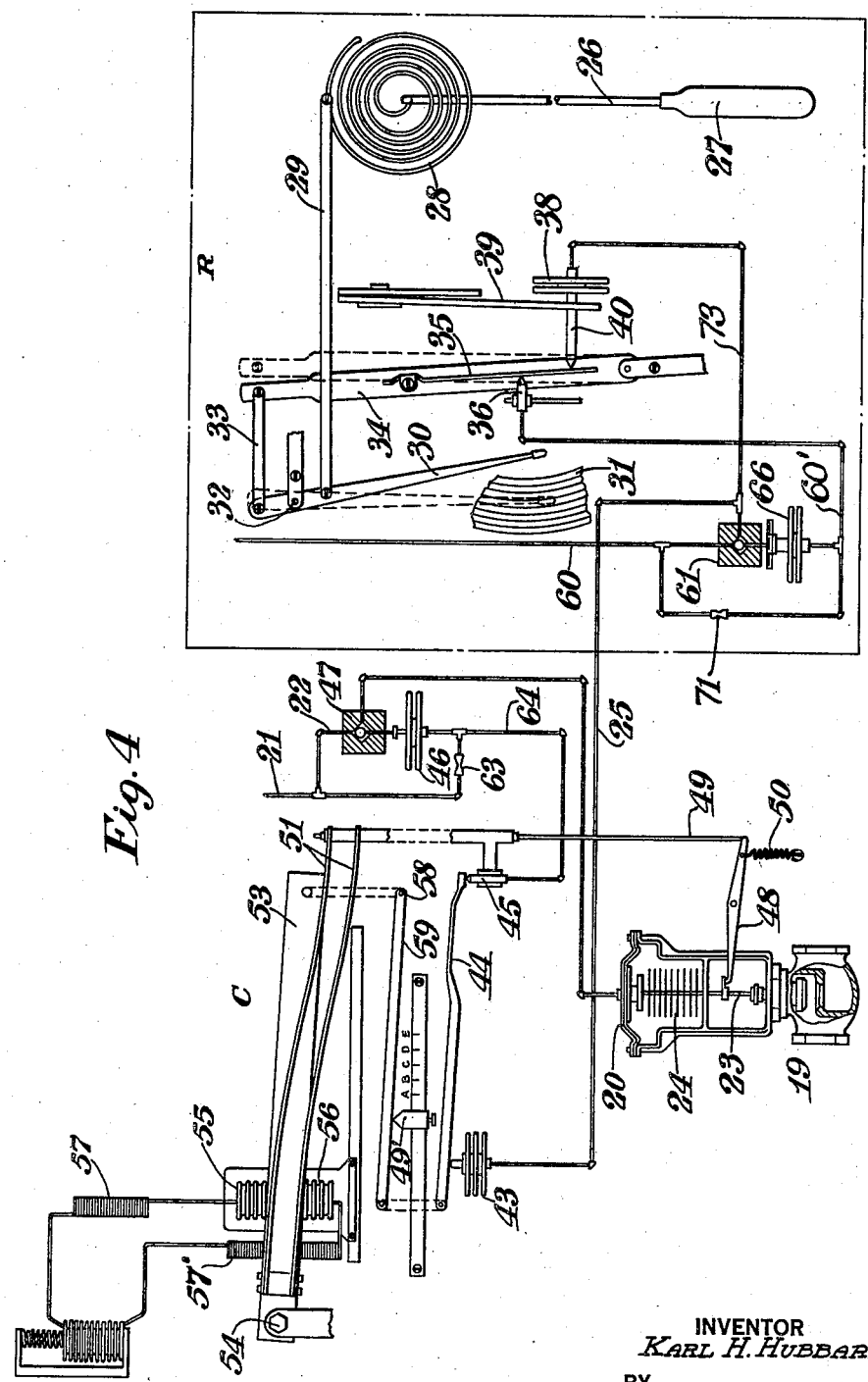

Patented Apr. 13, 1937

2,076,641

UNITED STATES PATENT OFFICE 2,076,641

HEAT EXCHANGE SYSTEM

Karl H. Hubbard, Rochester, N. Y., assignor to Taylor Instrument Companies, Rochester, N. Y., a corporation of New York Application May 12, 1934, Serial No. 725,307

15 Claims. (Cl. 236—18)

This invention relates to a heat exchange system and more particularly to the method of and to an arrangement for controlling the amount of heat introduced into a heat exchange system.

In the preparation of certain liquid products, notably in the pasteurization of milk, it is required that the product be heated to an exact predetermined temperature independently of wide variations in the rate of flow of the product through the heating system or pasteurizer and independently of extreme variations in temperature of the product introduced therein.

In one widely used type of heating system or pasteurizer for accomplishing this result, the product to be heated, such as milk, is caused to flow in heat exchange relation to a heated recirculating medium such as hot water, the temperature of which is maintained at the proper value to produce the desired heating effect. In this type of system steam is introduced into the heating medium under the control of a suitable heat regulating device or devices.

In the past, a thermosensitive element of a standard heat regulating device has been placed in the outlet through which the heated liquid is discharged from the heater. This regulating device was used to vary the steam supplied to the heater in proportion to the variation of the temperature of the outgoing liquid. The thermosensitive element of the regulating device has also been placed in the recirculating medium to regulate the steam supplied to this medium so that it was maintained at a substantially constant temperature in the region of the element.

It has been proposed to control the temperature of the heated liquid discharged from such a heater by utilizing a heat regulator having one thermosensitive element placed in the heated liquid and a second thermosensitive element placed in the heating medium, which elements cooperate to vary the quantity of steam supplied to the heating medium in proportion to the amount of heat required to maintain the liquid at the desired temperature.

It has likewise been proposed in such a heating system to use a heat regulator, one of the thermosensitive elements of which is placed in the recirculating heating medium or water at a point near its entrance to the heater, and the other thermosensitive element of which is also placed in the heating medium at a point near where it leaves the heater.

These prior methods, however, have failed to give the flexibility of operation and the exactness of temperature regulation necessary for such types of heat exchange systems. However, in accordance with the present invention a novel arrangement of dual response temperature regulation for a heat exchange system of the mentioned type is provided, in which but a single thermosensitive element placed in the heating medium is effective to maintain the liquid at substantially the exact predetermined temperature, in spite of adverse operating conditions.

In a heater wherein the recirculating medium is heated by the introduction of steam therein, the irregular injection of steam common to nearly all injectors, causes rapid variations in temperature in the circulating medium and in order to overcome this undesirable variation it has been the practice to provide an averaging tank between the injector T and the thermosensitive element. Such a tank is undesirable not only because of its cost and the larger quantity of recirculating medium required in the heat exchange system, but it is objectionable because of the longer time interval existing between the injection of steam and its effect on the temperature of the recirculating medium entering the heater.

In accordance with the present invention, a novel arrangement for averaging the temperature of the circulating medium in spite of the irregular injection of steam thereto, is used so that an averaging tank is unnecessary.

For a clearer understanding of the invention, reference is made to the drawings in which Fig. 1 is a diagrammatic showing of a recirculating heater or a milk pasteurizing system having incorporated therein a novel heat regulating arrangement; Fig. 2 is a sectional view of the mounting and construction of the bulb of the thermosensitive mechanism used in the heat-regulating device; Fig. 3 shows a slightly modified heat-regulating arrangement; and Fig. 4 is a more complete diagrammatic showing of the heat regulating arrangement disclosed in Fig. 1.

In Fig. 1, 5 designates a heater or milk pasteurizer in which the milk or other liquid product to be heated, is caused to flow through the product pipes 6 of the heater from the inlet 7 of this heater to the outlet 8 thereof. In the heater the product pipes 6 for the liquid to be heated, are enclosed by the pipes 9 through which hot water or other suitable heating medium is recirculated in heat exchange relation to the milk in a counter direction to that of the product or milk flow. As herein shown, the pipes 9 are included in a recirculating system which extends from the outlet of these pipes 9, through conduit 10, overflow tank 11, conduit 12, injector or suction T 13, conduit 14, connection T 15, conduit 16, water pump P and the conduit 17, to the inlet of the pipes 9.

In order to heat the water in the recirculating system, steam from a suitable source is introduced therein through conduit 18 and the injector or suction T 13 under the control of the regulating valve 19. This valve is of the pressure-fluid actuated type having a diaphragm motor top 20 to which pressure fluid, such as compressed air, from a suitable source is supplied through conduits 21 and 22 to operate valve stem 23 of the valve against the action of spring 24. The application of compressed air to the motor top of the valve is controlled by a dual response regulating mechanism C, as will be hereinafter described. This controlling action is effected through the pressure fluid conduit 25 which is connected to the regulating device generally designated R. The device R includes a Bourdon spring 28 (see Fig. 4) communicating with the capillary tube 26 which terminates in a thermo-sensitive bulb 27 extending into the recirculating heating medium through the connection T 15. This bulb, capillary tube and Bourdon spring may be filled with a liquid such as mercury, or with any suitable filling medium well-known in the art.

The actual construction of the dual response controlling mechanism C of the valve 19 is disclosed in the patent to Hubbard and Clarridge, No. 2,035,966, granted March 31, 1936, and the mechanism of the regulating instrument R is disclosed in the Foote application Serial No. 758,088, filed December 18, 1934, but the present diagrammatic showings of these mechanisms will be sufficient for this disclosure. It is sufficient to state that this regulating arrangement affords regulation of valve 19 with micrometer accuracy so that the exact amount of required heat is introduced into the recirculating system with the result that the milk or other heated product discharged from the outlet 8 of the heater is maintained substantially at the exact desired temperature irrespective of variations in the rate of its flow through the heater and/or irrespective of the temperature at which it is introduced into the heater through the inlet 7.

The construction and operation of the heat-regulating portion of the system can best be set forth by describing, briefly, the manner in which the temperature of the milk discharged from the heater is maintained at a predetermined value. For example, an increase in load such as an increase in the rate of flow of milk through the pipes 6, or a drop in temperature in the milk introduced into these pipes, results in an increased heat demand which reduces the temperature of the recirculating water about the bulb 27 below its previous value. The thermoresponsive fluid in this bulb and the capillary tube contracts, thereby permitting the Bourdon spring 28 to wind up and move the link 29 and pen arm 30 counterclockwise so that a record of the temperature drop is made on the clock-actuated chart 31. The pen arm 30, pivoted at 32, is connected by link 33 to a lever 34 which is pivotally supported at its lower end so that the pen arm and this lever swing in the same direction, in the present instance, counterclockwise. Lever 34 has pivotally mounted thereon a baffle 35 so that counterclockwise movement of this lever at this time moves the baffle 35 toward the nozzle 36. Normally, pressure fluid, such as compressed air, flows from a suitable source through conduit 60, restriction 71 and branch conduit 60' to nozzle 36 where it escapes under the control of baffle 35. As the baffle now moves toward nozzle 36, the distance between these elements decreases thereby building up an increased air pressure in bellows 66 to close air relay valve 61. This tends to cause a drop in pressure in conduits 73 and 25.

However, the bellows 38 contracts to decrease the tension in spring 39 with the result that the synchronizing pin 40 moves to the right. Spring 39 is adjustable in its support to vary its resilience. The movement of pin 40 allows baffle 35 to move slightly away from the nozzle so that the original movement of the baffle due to the action of the Bourdon spring 28 is modified. However, the total movement of the baffle at the nozzle and therefore the pressure change (pressure reduction in the case assumed) in the control conduit 25, is proportional to the temperature change at the bulb 27.

As the pressure in control conduit 25 is reduced, tricapsular bellows 43 of the dual response control unit C connected to this conduit contracts, thereby permitting the pivoted baffle 44 to move so that its free end is lowered toward nozzle 45. It will be understood that compressed air or other pressure fluid flowing from a suitable source through conduit 21, restriction 63 and conduit 64, normally escapes through this nozzle under the control of this baffle. This movement of the baffle 44 decreases the distance between it and the nozzle and causes an increase of air pressure in bellows 46, which tends to close air relay valve 47, resulting in a decrease of air pressure on the diaphragm motor top 20 of valve 19 to effect a greater opening of this valve. As the valve stem moves upward, the left end of the pivoted lever 48 follows, permitting push rod 49 to move downward by reason of the push rod spring 50. Push rod 49 which is connected at its upper end to spring levers 51, in moving downward carries with it nozzle 45 until the clearance between this nozzle and the baffle 44 is a few ten thousandths of an inch less than its original clearance. In other words, as the baffle 44 moves downward, the diaphragm motor top actuated indirectly by the nozzle moves the valve stem upward, lowering the nozzle in such a way that its motion almost exactly equals the motion of the baffle 44. In this way the control unit C permits an immediate response or increase in the flow of steam through the valve which is proportional to the temperature change at the bulb.

Inasmuch as there is tension on spring 51, due to the downward movement of the push rod 49, this same force is acting on main lever 53 pivoted at 54 since the two are fastened together as shown at the right of pivot 54 so that the free end of the main lever tends to move downward. The main lever, which is positioned between the two completely filled bellows 55 and 56 of a liquid damping system, as it moves downward, exerts a force on the bellows 56 and removes force from the upper bellows 55, thereby causing liquid to flow through resistance coils 57 and 57' into the upper bellows 55. This retardation in flow of liquid from one bellows to the other provides the time interval in which a further delayed response occurs, the duration of which varies according to the position of the damping assembly comprising bellows 55 and 56 on main lever 53. With the damping assembly located at various positions along the main lever with respect to its pivot 54, the time required for the liquid to flow from one bellows to the other may be varied at will.

As the free end of the main lever moves downward, it carries with it pivot 58 of transmitting lever 59 which swings about the adjustable fulcrum 49, causing its opposite or left end and the left end of the baffle 44 connected thereto, to rise. The stud of tricapsular bellows 43 acts as a fulcrum for baffle 44 so that the free end of this baffle moves gradually closer to the nozzle. This movement of the baffle further increases the pressure in bellows 46 which decreases the opening of air relay valve 47 to produce further upward travel of the valve stem of valve 19. This downward motion of the baffle continues until the valve 19 is opened sufficiently to introduce the necessary heat into the heating medium so that it attains a temperature proportionally higher than the predetermined temperature of the liquid depending on the change in load. The temperature attained on any given change in load is determined by the adjustment of fulcrum 49' of unit C. When this temperature is reached, the capsular diaphragm 43 has expanded sufficiently to stop further downward motion of the main lever 53 and the system is in equilibrium.

It can be shown both theoretically and experimentally that in order to maintain the temperature of the liquid leaving the heater at a substantially predetermined value, independent of changes in load such as variations in its flow and variations in its temperature on entering the heater, the temperature of the heating medium entering the heater must be varied. To be more specific, let it be assumed that the temperature of the liquid entering the heater is lowered. Then, the temperature of the water entering the heater must be raised a small amount, depending upon a number of factors, in order to keep the temperature of the milk leaving the heater, constant. In a similar way, this water temperature must be raised when the flow of milk through the heater is increased. Therefore, in general, it may be seen that under light loads when very little heat is being transferred from the water to the milk, the temperature of the water entering the heater need only be slightly above that of the desired temperature of the milk leaving the heater. However, under heavy loads, when a greater amount of heat is being transferred from the water to the milk, the temperature of the water entering the heater must be farther above that of the milk leaving the heater.

The heat-regulating apparatus of the system and more particularly the unit C is adjusted so that it is over-compensated or, has negative sensitivity, that is, the apparatus is adjusted to return the control temperature above the predetermined value in case the initial temperature deviation was downward. The adjustment is effected by positioning the pivot 49' to the right of the damping assembly which includes the bellows 55 and 56. This over-compensating adjustment is distinguished from the adjustment giving complete compensation of the device, which complete compensation is effected by adjusting the pivot 52 and the damping assembly in vertical alinement. By such over-compensation the temperature of the recirculating heating medium as it enters the heat exchanger has a variable value depending upon the load, but is always constant for any given load. This value depends directly on the load and not inversely thereto, as has been customary with the old type of regulator.

In former heating or pasteurizing systems of this type, it has been customary to provide an averaging tank in the recirculating system of the heating medium so that the irregular injections of heat into the heating medium do not cause an oscillating or erratic response of the thermosensitive element or bulb of the heat-regulating device. However, in accordance with the present invention means have been provided whereby such an averaging tank can be omitted and the regulating device is still rendered unresponsive to sudden fluctuating temperatures in the heating medium.

This is accomplished in the system of Fig. 1 in the manner more fully disclosed in the enlarged detail view of Fig. 2. In this arrangement the thermosensitive bulb 27 is preferably mounted in a separable well or socket 27a, although the invention is not limited to this construction. It will be noted that there is a space between the bulb and this well so that the intervening air therein acts as a heat insulator for the bulb whereby the effect of sudden minor fluctuations in temperature transmitted through the intervening air to the bulb, is greatly reduced. Thus this bulb mounting transmits to the regulating device R an averaged response to any rapidly fluctuating temperatures in the recirculating medium. This arrangement obviates the need of an averaging tank and possesses the following advantages: It is less costly than said tank; it reduces the required amount of recirculating medium, thereby reducing the time required for one cycle of said recirculating medium; it reduces the volume of recirculating medium between the suction T and the heat exchanger, thereby reducing the time interval between the actual steam injection and the effect on the heated liquid. The last two-named advantages tend to decrease the variation in temperature which normally occurs in the heated liquid after a load change.

Instead of using the separable well 27a just described, the same result may be achieved in the manner shown diagrammatically in Fig. 3. In this modified arrangement, the conduit 25 leading to the unit C is provided with a constriction 70 and a reservoir 71 of relatively large capacity which communicates with this conduit at a point between the constriction 70 and the unit C. This constriction and reservoir renders the unit C unresponsive to sudden minor changes in temperature at bulb 27, and thus effects a heat regulation only of the gradual temperature changes in the recirculating medium or water.

While the thermosensitive bulb 27 has been illustrated as introduced into the recirculating system at a point between the injector T 13 and the pump P, this bulb instead may be introduced in the circulating system at a point between the pump P and the water inlet of the heater 5.

Although the system as herein disclosed is arranged to open the valve 19 on the reduction of compressed air applied to its motor top, it will be understood that the valve may be so arranged that on a reduction or failure of the air pressure supplied thereto, this valve will close. Also the invention is not limited to a pressure fluid operated regulating system but it is equally applicable to a system wherein the regulating instrument is of the electrically operated type such as is disclosed in the application of William M. Young, Serial No. 684,855, filed August 12, 1933.

I claim:

1. The method of heating a flowing liquid to a predetermined temperature irrespective of variations in load such as variations in its rate of flow and/or its original temperature, which comprises causing said liquid to flow in heat exchange relation to a recirculating heating medium, detecting changes only in the temperature of said heating medium at a single region therein, and maintaining the medium at an increased predetermined temperature in response to the detected change in temperature for each increase in load.

2. The method of heating a flowing liquid to a predetermined temperature irrespective of variations in load such as variations in its rate of flow and/or its original temperature, which comprises causing said liquid to flow in heat exchange relation to a recirculating heating medium, detecting changes in the temperature of said heating medium only at a single region therein, and maintaining the medium at a higher predetermined temperature for each increase in load, said maintained temperature being selected in response to the detected change in temperature of said medium.

3. The method of heating a flowing liquid to a predetermined temperature independent of variations in load such as variation in its rate of flow and/or variations in its original temperature which comprises causing said liquid to flow in heat exchange relation to a recirculating heating medium, detecting any changes in the temperature only of said heating medium at a single region therein due to a changing load, and introducing heat into said medium as a function of the detected temperature change and as a function of time of the temperature deviation in order to maintain the temperature of said medium always above the predetermined temperature of the liquid.

4. The method of heating a flowing liquid to a predetermined temperature independent of variations in load such as a change in the rate of flow of said liquid and/or a change in its original temperature, which comprises causing said liquid to flow in heat exchange relation to a recirculating medium, maintaining said medium at a higher temperature than the predetermined temperature of said liquid, sensing only the temperature of said medium at a single region therein and supplying heat to said medium in response to any reduction in the sensed temperature thereof to raise its temperature to a value above that which existed prior to any increase in the load.

5. The method of heating a flowing liquid to a predetermined temperature in spite of variations in load, such as a change in the rate of flow of said liquid and/or its original temperature, which comprises causing said liquid to flow in heat exchange relation to a recirculating medium, maintaining said medium at a higher temperature than the predetermined temperature only of said liquid, sensing the temperature of said medium at a single region therein, and in response to any increase in the sensed temperature of said medium, regulating the amount of heat supplied to said medium whereby its temperature is lowered to a value below that which existed prior to any reduction in the load.

6. In an arrangement of the class described, a heat exchanger for heating a liquid to a predetermined temperature, a recirculating system for a heating medium including said heat exchanger, means for introducing heat into said recirculating system, and a heat regulating device over-compensated for load deviations, said device being responsive only to the load on said heat exchanger at a single region for controlling the operation of said means.

7. In an arrangement of the class described, a heat exchanger for heating a liquid to a predetermined temperature, a recirculating system for a heating medium including said heat exchanger, means including a valve governing the introduction of heat into said recirculating system, and a heat regulating device over-compensated against temperature deviations due to load changes, said device being provided with but a single thermosensitive element responsive to the heat demand on said heat exchanger for controlling the operation of said valve.

8. In an arrangement of the class described, a heat exchanger for heating a liquid to a predetermined temperature, a recirculating system for a heating medium including said heat exchanger, means for introducing heat into said recirculating system, and a heat regulating device for controlling the operation of said means, said device being over-compensated for load deviations and including but a single thermosensitive element located in said recirculating system responsive to the load on said heat exchanger.

9. In an arrangement of the class described, a heat exchanger for heating a liquid to a predetermined temperature, a recirculating system for a heating medium including said heat exchanger, means including a valve governing the introduction of heat into said recirculating system, and a heat regulating device for controlling the operation of said valve, said device being over-compensated for load deviations and including but a single thermosensitive bulb responsive to the heat demand on said heat exchanger.

10. The method of heating a flowing liquid to a predetermined temperature irrespective of variations in load such as variation in its rate of flow and/or variations in its original temperature which comprises causing said liquid to flow in heat exchange relation to a recirculating medium, detecting only changes in the temperature of said heating medium at a single region therein, due to said changing rate of flow and/or the original temperature of said liquid, and introducing heat into said medium under the control of an averaged response to changes in temperature of said medium and in amounts just sufficient to maintain the predetermined temperature of said liquid.

11. The method of heating a flowing liquid to a predetermined temperature in spite of variations in load such as variations in its rate of flow and/or in its original temperature which comprises causing said liquid to flow in heat exchange relation to a recirculating medium, detecting only changes in the temperature of said heating medium at a single region therein, due to a changing load and introducing heat into said medium as a function of the detected temperature change and as a function of the time of temperature deviation in order to maintain the temperature of said medium always above the predetermined temperature of said liquid.

12. In an arrangement of the class described, a heat exchanger, a recirculating system for a heating medium including said heat exchanger, means for introducing heat into said recirculating system, and a heat regulating device for controlling the operation of said means, said device being over-compensated against load deviations and including a single thermosensitive element, said element being located in said recirculating system and being responsive only to the average effect of rapid temperature changes in said medium.

13. In an arrangement of the class described, a heat exchanger, a recirculating system for a heating medium including said heat exchanger, means including a valve governing the introduction of heat into said recirculating system, and a heat regulating device for controlling the operation of said valve, said device being over-compensated against load deviations and including but a single thermosensitive bulb responsive only to the averaged effect of fluctuating temperature changes only in said medium.

14. In an arrangement of the class described, a heat exchanger, a recirculating system for a heating medium including said heat exchanger, mechanism for introducing heat into said recirculating system, said mechanism including a thermosensitive element responsive to the temperature of said medium, and means for averaging the response of said element to fluctuating temperature changes in said medium whereby the need for an averaging tank in said system is obviated.

15. In an arrangement of the class described, a heat exchanger, a recirculating system for a heating medium including said heat exchanger, means including a valve governing the introduction of heat into said recirculating system, a device including a thermosensitive element responsive to the temperature of said medium for regulating the operation of said valve, and means for averaging the response of said element to fluctuating temperature changes in said medium whereby the need for an averaging tank in said system is obviated.

KARL H. HUBBARD.